(12) United States Patent
Heinkel et al.

(10) Patent No.: US 8,345,703 B2
(45) Date of Patent: Jan. 1, 2013

(54) METHOD AND APPARATUS FOR RECONFIGURING IC ARCHITECTURES

(75) Inventors: Ulrich Heinkel, Chemnitz (DE);
Joachim Knaeblein, Erlangen (DE);
Axel Schneider, Baiersdorf (DE)

(73) Assignee: Alcatel Lucent, Paris (FR)

( * ) Notice: Subject to any disclaimer, the term of this patent is extended or adjusted under 35 U.S.C. 154(b) by 532 days.

(21) Appl. No.: 12/311,390

(22) PCT Filed: Oct. 3, 2006

(86) PCT No.: PCT/US2006/038487
§ 371 (c)(1),
(2), (4) Date: Jun. 8, 2009

(87) PCT Pub. No.: WO2008/041978
PCT Pub. Date: Apr. 10, 2008

(65) Prior Publication Data
US 2011/0255441 A1     Oct. 20, 2011

(51) Int. Cl.
*H04L 12/28* (2006.01)
(52) U.S. Cl. ........................................ 370/419; 709/251
(58) Field of Classification Search .................. 370/258, 370/389, 406, 419, 465; 709/231, 251
See application file for complete search history.

(56) References Cited

U.S. PATENT DOCUMENTS

| | | | |
|---|---|---|---|
| 6,272,144 B1 | 8/2001 | Berenbaum et al. | |
| 6,326,806 B1* | 12/2001 | Fallside et al. | 326/38 |
| 6,888,371 B2* | 5/2005 | Wong | 326/38 |
| 7,770,179 B1* | 8/2010 | James-Roxby et al. | 719/312 |
| 2003/0208577 A1* | 11/2003 | Grigsby | 709/223 |
| 2005/0257031 A1* | 11/2005 | Kundu et al. | 712/226 |
| 2006/0035603 A1* | 2/2006 | Al-Adnani | 455/90.2 |
| 2007/0244959 A1* | 10/2007 | Teig et al. | 708/700 |

FOREIGN PATENT DOCUMENTS

| | | |
|---|---|---|
| CN | 1250567 | 4/2000 |
| CN | 1605058 | 4/2005 |
| GB | 2 395 639 | 5/2004 |
| WO | WO 02/21693 | 3/2002 |

OTHER PUBLICATIONS

Altera Corporation Note 346; Using the Nios Development Board Configuration Controller Reference Designs; Jul. 2006; pp. 1-21; XP002432665.
M. Dyer and M. Wirz; Reconfigurable System on PFGA; Diploma Thesis DA-2022.14; 2002; XP002432666; Swiss Federal Institute of Technology; Zurich.
Laufer R. et al; PCI-PipeRench and the SWORDAPI: A System for Stream-Based Reconfigurable Computing; Field-Programmable Custom Copmuting Machines, 1999.
Seventh Annual IEEE Symposium on Napa Valley, CA USA; Apr. 21-23, 1999; Los Alamitos, CA, USA, IEEE Comput. Soc., US Apr. 21, 1999; pp. 200-208; XP010359146.

\* cited by examiner

*Primary Examiner* — Jung Park
(74) *Attorney, Agent, or Firm* — Carmen Patti Law Group, LLC (57) ABSTRACT

A reconfigurable hardware architecture, in the form of a System-on-Chip (1), includes an ASIC (19) and an embedded FPGA (18) which define static and reconfigurable parts of an IC architecture (15) respectively. Incoming Ethernet, or other format, packets are applied to a packet filter (14), which detects those packets containing reconfiguration data. The reconfiguration data is used to update the FPGA (18).

35 Claims, 8 Drawing Sheets

| DESTINATION MAC ADDRESS | SOURCE MAC ADDRESS | IP TYPE | PAYLOAD | CRC CHECKSUM |

THE RECONFIGURATION DATA PAYLOAD

| RECONFIGURATION DATA HEADER | RECONFIGURATION DEVICE ADDRESS | RECONFIGURATION DATA PACKET NUMBER | RECONFIGURATION DATA PORTION |

G.709 OTN FRAME

METHOD AND APPARATUS FOR RECONFIGURING IC ARCHITECTURES

FIELD OF THE INVENTION

The present invention relates to a method and apparatus for reconfiguring Integrated Circuit (IC) architectures, and more particularly, IC architectures having a static part and a reconfigurable part, such as a Field Programmable Gate Array (FPGA) embedded in an Application Specific Integrated Circuit (ASIC), for example.

BACKGROUND OF THE INVENTION

Different types of IC architectures are available with various characteristics, giving a designer a choice in selecting the most appropriate for a particular purpose, such as, for example, signal processing in communication systems.

ASICs have a number of advantages. ASICs typically operate at a relatively low power and, if a large production run is involved, can be inexpensive to manufacture. In addition, they can be more densely provided in a system because of their relatively lower power consumption, reducing cooling requirements. This is important as systems become increasingly complex and sophisticated, requiring increased processing capability. However, it is not possible to correct or update an existing ASIC. In case of errors, or if protocol standards are changed, an expensive and time-consuming respin is required, with field exchange of circuit packs. For equipment operating under well-established standards and protocols, a manufacturer may decide to use ASICs in a system, if an assessment demonstrates a low risk that subsequent changes may be needed to the design as originally configured. For the established SDH/SONET features in communications systems, this risk is manageable and ASICs are widely used.

One alternative to an ASIC is an FPGA. FPGAs offer enhanced versatility, as they may be re-configured after manufacture. However, they also have significant disadvantages compared to ASICs, being more expensive to manufacture and consuming significantly higher power. High power consumption may lead to potential full volume capacity being unattainable because sufficient cooling cannot be provided. As an example, a typical ASIC may cost $200 and consume 4 W whereas an equivalent FPGA may cost about $400 and consume 12 W of power. Network Processors (NPs) may be used as an alternative to FPGAs, but their costs and power consumption are typically greater than those of FPGAs.

In emerging technologies, or fields where standardization is not complete or subject to change, such as certain communication fields, a manufacturer may be exposed to a high risk of having to recall and re-install ASICs to accommodate changes subsequent to its equipment deployment. Thus, a manufacturer may be compelled to use the less satisfactory FPGA to achieve the required flexibility.

One proposal for harnessing the advantages of ASICs with the flexibility of FPGAs is to combine the two types in an IC architecture. The most stable part of an architecture is implemented by an ASIC and an embedded FPGA is included to allow adjustments to be made to less well-defined parts of the architecture as requirements change, or for those parts which might be subject to bugs and require later fixes. The FPGA may be re-configured following installation by downloading instructions when software is updated.

Another proposal for signal processing products used in an optical network involves providing a dedicated channel via which reconfiguration instructions are transmitted to an FPGA when reconfiguration is required. It is suggested that an overhead channel of the optical transport protocol "OTN" (Optical Transport Network) be used (see ITU-T G.709. Interfaces for the Optical Transport Network (OTN) and ITU-T G.789. Characteristics of the Optical Transport Network hierarchy equipment functional blocks). This approach can only be used for OTN systems and requires an OTN network and dedicated OTN connections to each system for the transport of the reconfiguration data. Other kinds of systems cannot be upgraded this way. Even if an OTN interface were be added to the systems, which would probably be impracticably expensive, an existing OTN network would be required to transport the reconfiguration data.

Similar concepts for transporting reconfiguration data using dedicated transport channels in an OTN system have been discussed in a master thesis by Mateusz Majer, "Evaluation of Reconfigurable Architectures for Overhead Processing in Optical Transport Networks", Technical University of Darmstadt, 2003, and in a master thesis by Ashok-Kumar Chandra-Sekaran, "Reconfigurable RISC core based architecture for overhead processing in Optical Transport Network", University of Karlsruhe, 2004.

BRIEF SUMMARY OF THE INVENTION

According to an aspect of the invention, a method for reconfiguring an integrated circuit (IC) architecture having a static part and a reconfigurable part includes sending to the IC architecture reconfiguration data contained in reconfiguration packets. Reconfiguration data contained in the reconfiguration packets is used to reconfigure the reconfigurable part of the IC architecture. The method potentially provides a powerful, flexible and inexpensive approach that can be applied to a wide range of systems based on different technologies, and not, for example restricted only to OTN systems. In addition, it may be possible to reconfigure a large number of IC architectures remotely by a single operation.

In a method in accordance with the invention, the reconfiguration packets may be, for example, Ethernet packets, Internet Protocol (IP) packets, or packet formats used in ATM, UMTS, Fibre Channel or some other format or protocol, or could comprise combinations of different types of data packets. Thus, the format could be related to a Layer 1 or a Layer 2 communications protocol, for example. In one method in accordance with the invention, the reconfiguration data is contained only in the payload section of the data packet. In another method, some of the reconfiguration data, for example, an identifier that the packet contains reconfiguration data, is included in part of the packet other than the payload section. A standard packet filter is likely to have easier access to the packet header, and thus an indicator included in the packet header would facilitate routing of reconfiguration packets to the correct destination. For example, a reserved MAC (Medium access Control) address in a packet header may indicate that the payload is reconfiguration data. In another method, where an identifier is included in the payload instead, a VLAN tag could be used, located for example, at specific bytes in the packet payload.

Using a method in accordance with the invention, reconfiguration instructions may be applied to reconfigure the IC architecture without interrupting other data sent to a system incorporating the IC architecture, for example, data involved with an end user's use of the system. The IC architecture within the system may itself detect, for example, from addresses or tags in the packet overhead, that reconfiguration data is arriving and initiate its own update using the data. If there is a Quality of Service (QoS) function implemented by the system, the reconfiguration packets may be identified as having lower QoS requirements than packets that do not include reconfiguration data, although the relative priorities may be different depending on the application.

In one method in accordance with the invention, for systems supporting Ethernet, or Ethernet over SDH/SONET, as a customer service, the Ethernet data stream, which is processed by the system during conventional operation in any case, also transports the reconfiguration data via the Ethernet and/or SDH/SONET network to the system and within the system to the reconfigurable part of the IC architecture itself.

Thus, in one method in accordance with the invention, an ASIC and an embedded FPGA are included in a reconfigurable Systems-on-Chip design and reconfiguration data is transmitted in an Ethernet data stream. Using such Systems-on-Chip in a network with Ethernet transport capabilities, it is possible to update all chips in the network by distributing the reconfiguration data as an Ethernet packet broadcast. Depending on the confidentiality requirements, it may be possible to distribute such reconfiguration data via the public Internet if a suitable connection exists. Data protection may be ensured using a Virtual Private Network (VPN) for transmission, or some other suitable encryption or secure method, such as Data Encryption Standard (DES), Advanced Encryption Standard (ABS) or other approaches. The Ethernet transport/routing functionality of the network itself ensures that the reconfiguration data is distributed to all systems in the network, providing the network is appropriately configured. Ethernet transport capabilities are widely deployed, with a large installed base and existing public connections, for example, via the Internet. Many devices currently available include Ethernet interfaces and a more or less protected connection to the Internet or a restricted Intranet. Reconfigurable chips may be included in any type of equipment with these attributes and an update can be initiated by sending reconfiguration data as an Ethernet reconfiguration packet stream through existing Ethernet connections.

The IC architecture may include other types of reconfigurable components. For example, an NP may be used in place of an FPGA. Also, the invention may be applied to reconfigurable hardware architecture where the reconfigurable part is embedded in the static part or it may be included as a separate block next to the static part, or both approaches may be included, for example. A single chip may include different reconfigurable parts that are separately addressable for independent updating.

According to another aspect of the invention, a system includes an IC architecture having a static part and a reconfigurable part; a packet filter for detecting reconfiguration packets including reconfiguration data; and a reconfiguration controller for using the reconfiguration data to reconfigure the reconfigurable part of the IC architecture.

According to yet another aspect of the invention, a network comprises a plurality of systems, each system including: an IC architecture having a static part and a reconfigurable part; a packet filter for detecting reconfiguration packets including reconfiguration data; and a reconfiguration controller for using the reconfiguration data to reconfigure the reconfigurable part of the IC architecture. The network further comprises means for forming reconfiguration packets; and a distributor for distributing the reconfiguration packets to the systems.

BRIEF DESCRIPTION OF THE DRAWINGS

Some embodiments and methods in accordance with the present invention will now be described by way of example only, and with reference to the accompanying drawings, in which.

DETAILED DESCRIPTION

Figure 1:
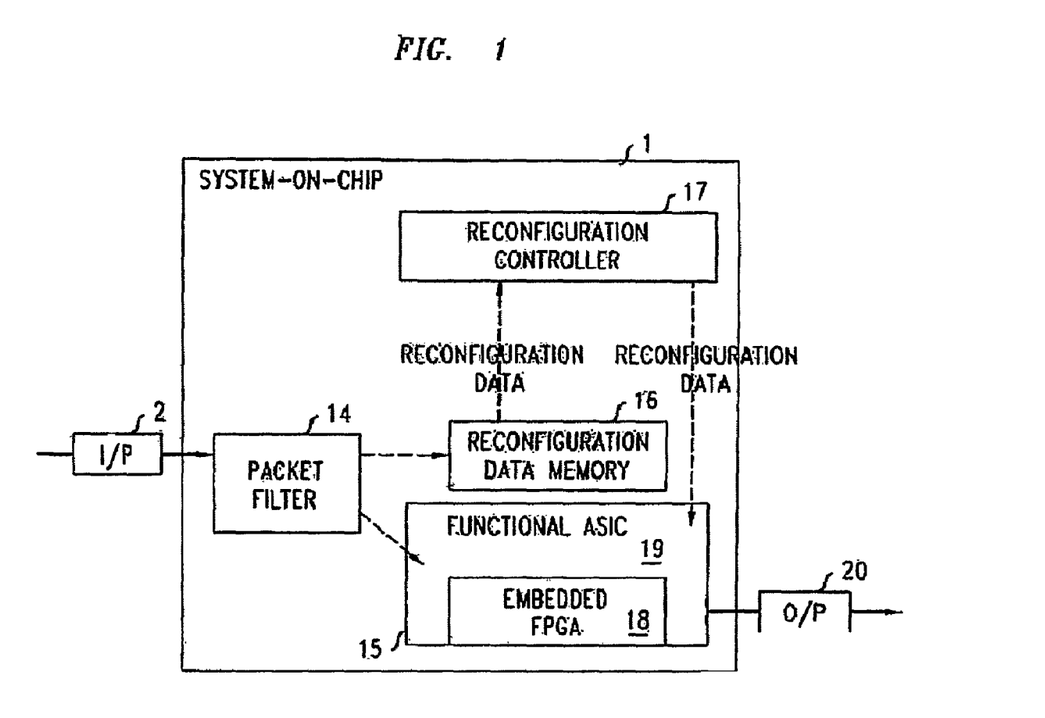
FIG. 1 schematically illustrates a reconfigurable chip architecture in accordance with the invention.

With reference to FIG. 1, a System-on-Chip 1 has an input 2, which is a standard physical interface for Ethernet, used for both input and output, which converts analog Ethernet signals into a digital bit stream and vice versa. Customer and reconfiguration Ethernet packets are applied to the input 2.

Figure 2:
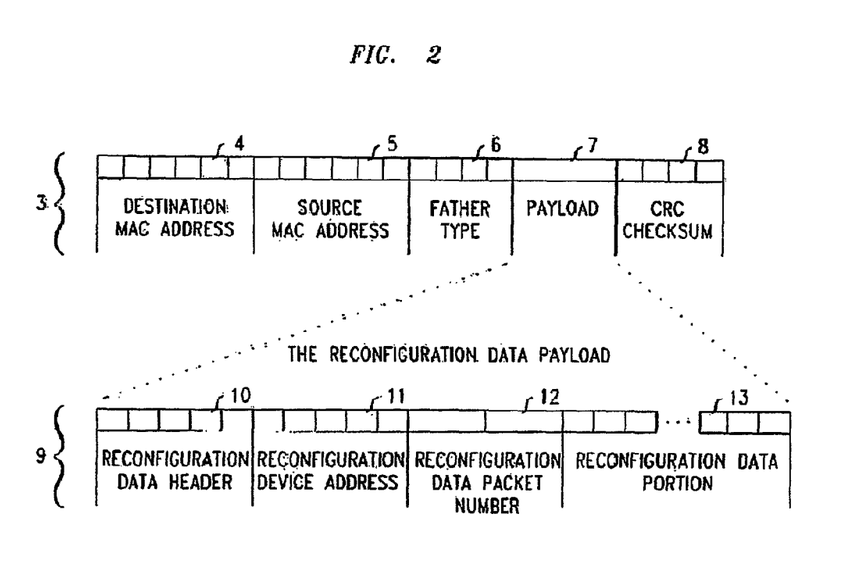
FIG. 2 is a schematic representation of an Ethernet packet including reconfiguration data.

FIG. 2 gives an example of a reconfiguration Ethernet packet 3 that includes reconfiguration data. The packet 3 has a type II Ethernet Frame format, and includes a section with the destination MAC (Medium Access Control) address 4, the source MAC address 5, the Ethernet type 6, payload 7 and CRC checksum 8 for checking the completeness and correctness of the data. The destination MAC address 4 identifies that the packet contains reconfiguration data.

The payload 7 includes the reconfiguration data, shown at 9. It has a reconfiguration data header 10, reconfiguration device address 11, reconfiguration packet number 12 and the reconfiguration data portion 13. The data header includes QoS information, which in this embodiment, indicates that the reconfiguration packets have a lower priority than customer packets. The reconfiguration device address 11 identifies the reconfigurable part that is to be updated by the reconfiguration data. Alternatively, for example, the reconfiguration device address 11 is used to identify the packet as a reconfiguration packet.

The reconfiguration data packet number 12 is used to identify the order of the packets making up a set of instructions. The reconfiguration data portion 13 is the data to be applied to the reconfigurable part of the IC architecture to update it.

The data packets are applied to a packet filter 14, which checks each incoming packet to determine if it is a normal packet or a packet containing reconfiguration data by detecting the destination MAC address in the packet header at 4. Normal packets are forwarded to the packet processing functions in an IC architecture 15 included in the system 1. Each reconfiguration packet is sent in parallel to a reconfiguration data memory 16 and also broadcast to the packet processing functions in the IC architecture 15 for onward transmission. The broadcast is required as the reconfiguration packets need to be transported to other systems in the network also, and therefore they cannot be terminated in this system 1.

The reconfiguration data memory 16 collects all reconfiguration packets which are sent to it by the packet filter 14. Due to the characteristics of Ethernet transmission, the packets might not arrive in the correct order, and the same packet may be received several times. The data memory 16 provides enough space for the data to be sorted into the correct order and for duplicate packets to be identified and discarded. A reconfiguration controller 17 takes the reconfiguration data from the packet payload, including FPGA programming addresses and checksums. The reconfiguration controller 17 checks if the data is complete, by means of the FPGA addresses and size of the data, and if it is correct, by means of the checksum. Once the data is complete, the reconfiguration controller 17 begins to reprogram the reconfigurable part, an embedded FPGA 18, of the IC architecture 15, according to the procedures defined by the FPGA vendor. The IC architecture 15 also includes a static part, ASIC 19. The ASIC 19 contains the "stable" parts of the chip functionality, for example, Layer2/Layer3 signal processing.

The broadcast reconfiguration packets and customer packets are then output from the system 2 at output 20.

Figure 3:
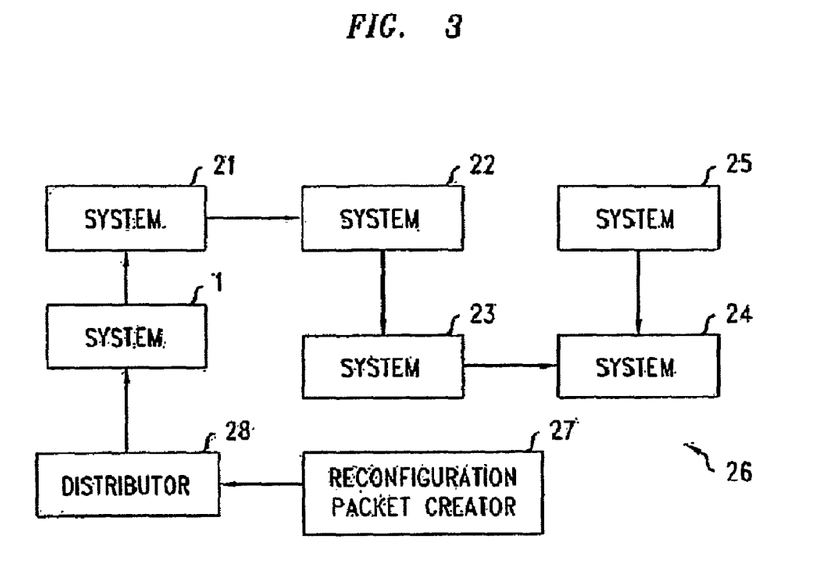
FIG. 3 schematically illustrates a network including the system of FIG. 1.

The system shown in FIG. 1 is one of a plurality of systems 1, 21 to 25 included in a network 26 as shown in FIG. 3. Some of the systems include the same FPGA as that included in the system 1 of FIG. 1 and also require reprogramming. The network also includes a reconfiguration packet creator 27 at which the reconfiguration data is formed into Ethernet packets and a distributor 28 for distributing the reconfiguration packets to the systems 1, 21 to 25, those systems incorporating the affected FPGAs then updating them in a similar manner to that described with reference to the system 1 of FIG. 1.

Figure 4:
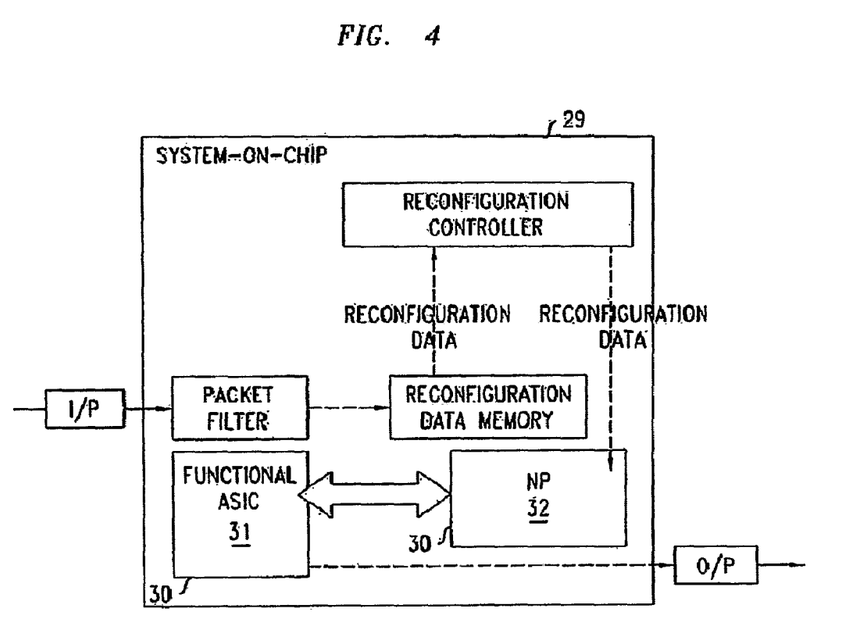
FIG. 4 schematically illustrates another reconfigurable chip architecture in accordance with the invention.
Figure 5:
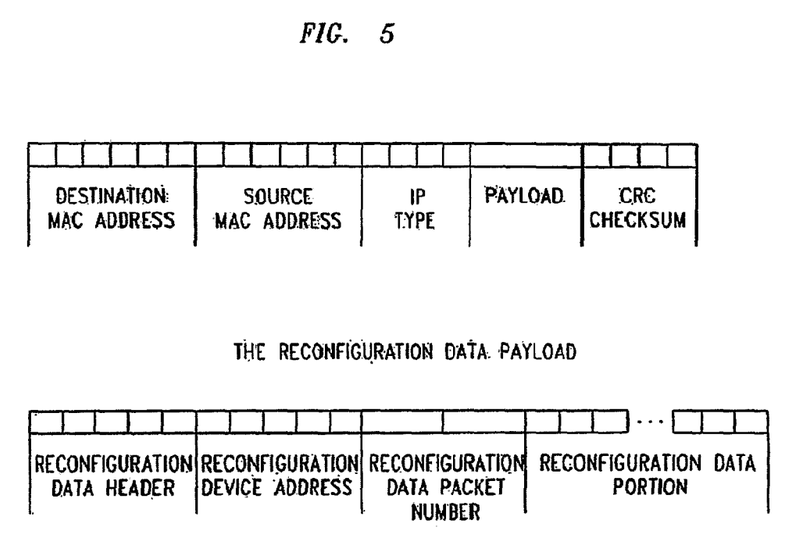
FIG. 5 schematically illustrates an IP packet including reconfiguration data.

With reference to FIG. 4, a System-on-Chip 29 is similar to that shown in FIG. 1, except that in this case, the IC architecture 30 includes an ASIC 31 for implementing static parts of the architecture and an NP 32 connected to the ASIC 31 and located next to it on the same chip. In this method, the reconfiguration data is sent as IP packets, one of which is shown schematically in FIG. 5. In an alternative, the NP 32 could be replaced by an FPGA.

Figure 6:
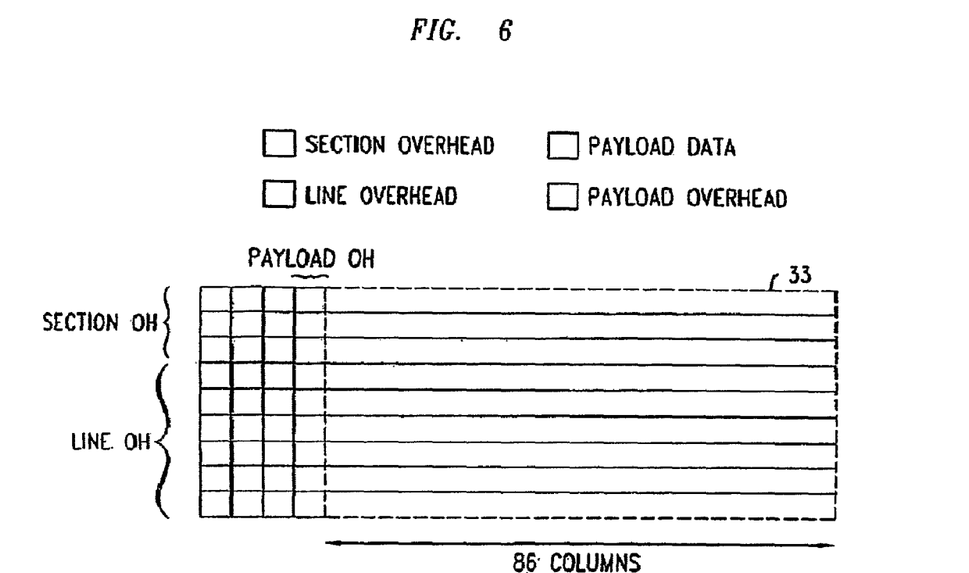
FIG. 6 schematically illustrates a SONET STS-1 frame including reconfiguration data.
Figure 7:
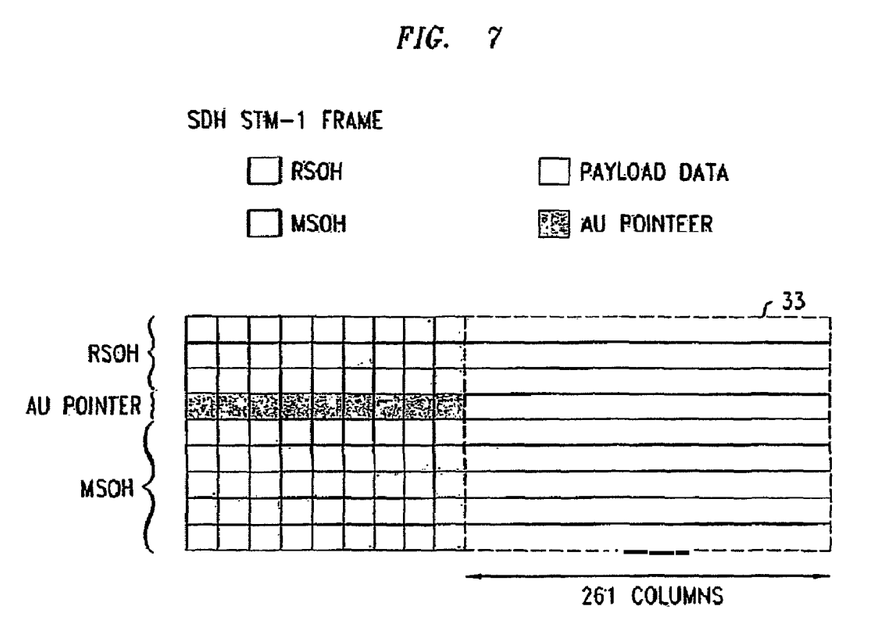
FIG. 7 schematically illustrates an SDH STM-1 Frame including reconfiguration data.
Figure 8:
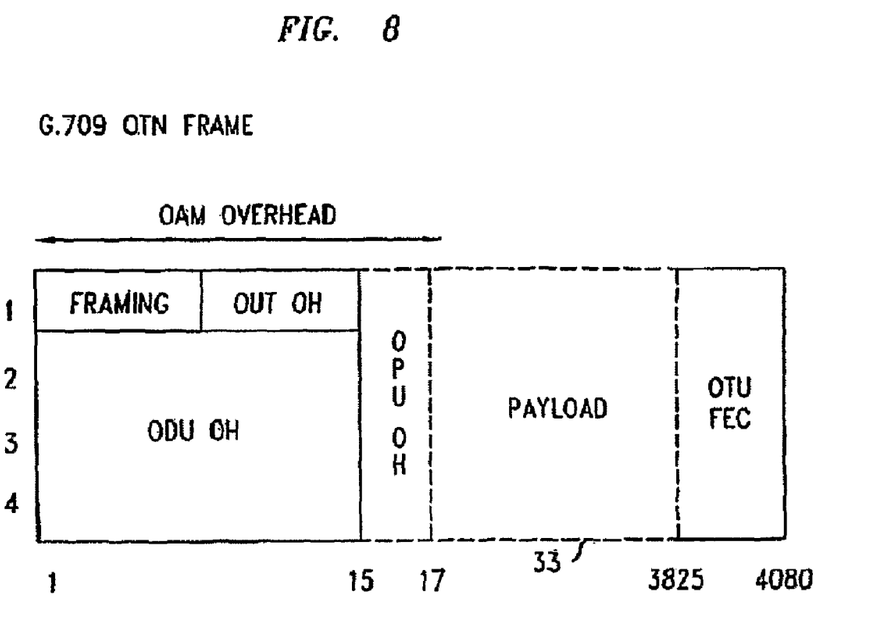
FIG. 8 schematically illustrates a G.709 OTN Frame including reconfiguration data.

Other types of packet format including reconfiguration data are illustrated in FIGS. 6, 7 and 8 which show a SONET STS-1 frame, an SDH STM-1 Frame and a G.709 OTN Frame respectively. In each case, the reconfiguration data is included in the region indicated by the broken line 33. Any of theses formats may be used in accordance with the invention in a system similar to that shown in FIG. 1, for example. Other formats not specifically illustrated may also be used in a method and apparatus in accordance with the invention.

The present invention may be embodied in other specific forms, and implemented by other methods, without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for reconfiguring an integrated circuit (IC) architecture, the IC architecture having a static part and a reconfigurable part, including the steps of:
   detecting each incoming packet with a packet filter to determine whether it is a reconfiguration packet including reconfiguration data or a non-reconfiguration packet;
   if the packet is determined to be a non-reconfiguration packet, forwarding the non-reconfiguration packet to the static part of the IC architecture;
   if the packet is determined to be a reconfiguration packet, sending to the reconfigurable part of the IC architecture reconfiguration data contained in the reconfiguration packets; and
   applying reconfiguration data contained in the reconfiguration packets to reconfigure the reconfigurable part of the IC architecture.

2. The method as claimed in claim 1 and wherein the reconfiguration packets are Ethernet packets.

3. The method as claimed in claim 1 and wherein the reconfiguration packets are IP packets.

4. The method as claimed in claim 1 and including sending the reconfiguration packets in a data stream with non-reconfiguration packets.

5. The method as claimed in claim 1 and applying a Quality of Service requirement to reconfiguration packets.

6. The method as claimed in claim 1 and wherein the reconfiguration data is contained only in the payload section of the reconfiguration packets.

7. The method as claimed in claim 1 and wherein the headers of the reconfiguration packets include an indication that they are reconfiguration packets.

8. The method as claimed in claim 1 and wherein the static part of the IC architecture is an Application Specific Integrated Circuit (ASIC).

9. The method as claimed in claim 1 wherein the reconfigurable part of the IC architecture is a Field Programmable Gate Array (FPGA).

10. The method as claimed in claim 1 and wherein the reconfigurable part of the IC architecture is a Network Processor (NP).

11. The method as claimed in claim 1 wherein the reconfigurable part is embedded in the static part.

12. The method as claimed in claim 11 and wherein the IC architecture includes a Field Programmable Gate Array (FPGA) embedded in an Application Specific Integrated Circuit (ASIC).

13. The method as claimed in claim 11 and wherein the IC architecture includes a Network Processor (NP) embedded in an Application Specific Integrated Circuit (ASIC).

14. The method as claimed in claim 1 and wherein the reconfigurable part is located next to the static part.

15. The method as claimed in claim 14 and wherein the IC architecture includes an FPGA located next to an ASIC.

16. The method as claimed in claim 14 and wherein the IC architecture includes a Network Processor (NP) located next to an Application Specific Integrated Circuit (ASIC).

17. The method as claimed in claim 1 and comprising a System-on-Chip in which the IC architecture is included.

18. The method as claimed in claim 1 and including the step of forming reconfiguration packets, each including information identifying the reconfigurable part of the IC architecture and reconfiguration data associated with the identified reconfigurable part.

19. The method as claimed in claim 1 and including the step of broadcasting reconfiguration packets containing reconfiguration data.

20. The method as claimed in claim 19 and, in parallel with broadcasting reconfiguration packets, including the step of sending reconfiguration packets to a reconfiguration controller for ordering them.

21. The method as claimed in claim 1 and including the step of collecting reconfiguration packets and sorting the reconfiguration data that they contain prior to applying it to the reconfigurable part of the IC architecture.

22. The method as claimed in claim 1 and including numbering reconfiguration packets, and using the numbering to correctly order the reconfiguration data.

23. The method as claimed in claim 1 and including the IC architecture itself detecting that reconfiguration data is arriving and initiating its own update using the data.

24. The method of claim 1, further comprising the step of:
   broadcasting the reconfiguration packet in parallel with the step of sending.

25. A system including:
- an IC architecture having a static part and a reconfigurable part;
- a packet filter for detecting reconfiguration packets including reconfiguration data; and
- a reconfiguration controller for using the reconfiguration data to reconfigure the reconfigurable part of the IC architecture;
- wherein the packet filter detects each incoming packet to determine whether it is a reconfiguration packet including reconfiguration data or a non-reconfiguration packet;
- if the packet is determined to be a non-reconfiguration packet, the packet filter forwards the non-reconfiguration packet to the static part of the IC architecture; and
- if the packet is determined to be a reconfiguration packet, the packet filter sends to the reconfigurable part of the IC architecture reconfiguration data contained in the reconfiguration packet for reconfiguration of the reconfigurable part of the IC architecture.

26. The system as claimed in claim 25 and wherein the packet filter filters reconfiguration Ethernet packets.

27. The system as claimed in claim 25 and wherein the packet filter filters reconfiguration IP packets.

28. The system as claimed in claim 25 and wherein the static part is an Application Specific Integrated Circuit (ASIC).

29. The system as claimed in claim 25 and wherein the reconfigurable part is a Field Programmable Gate Array (FPGA).

30. The system as claimed in claim 25 and wherein the reconfigurable part is embedded in the static part.

31. The system as claimed in claim 25 and wherein the static part is located adjacent the reconfigurable part.

32. The system as claimed in claim 25 and wherein the system is a System-on-Chip.

33. The system of claim 25, wherein the packet filter forwards the reconfiguration packet to the static part of the IC architecture in parallel with sending to the reconfigurable part of the IC architecture the reconfiguration data.

34. A network comprising a plurality of systems, each system including:
- an IC architecture having a static part and a reconfigurable part;
- a packet filter for detecting reconfiguration packets including reconfiguration data; and
- a reconfiguration controller for using the reconfiguration data to reconfigure the reconfigurable part of the IC architecture; and
- the network further comprising means for forming reconfiguration packets; and
- a distributor for distributing the reconfiguration packets to the systems;
- wherein the packet filter detects each incoming packet to determine whether it is a reconfiguration packet including reconfiguration data or a non-reconfiguration packet;
- if the packet is determined to be a non-reconfiguration packet, the packet filter forwards the non-reconfiguration packet to the static part of the IC architecture; and
- if the packet is determined to be a reconfiguration packet, the packet filter sends to the reconfigurable part of the IC architecture reconfiguration data contained in the reconfiguration packet for reconfiguration of the reconfigurable part of the IC architecture.

35. The network of claim 34, wherein the packet filter forwards the reconfiguration packet to the static part of the IC architecture in parallel with sending to the reconfigurable part of the IC architecture the reconfiguration data.

* * * * *